United States Patent
Terakawa et al.

(10) Patent No.: US 9,108,636 B2
(45) Date of Patent: Aug. 18, 2015

(54) TRANSMISSION CONTROL DEVICE FOR HYBRID VEHICLE

(75) Inventors: Tomomitsu Terakawa, Anjo (JP); Yasuhiro Hosoi, Chiryu (JP); Yuichiro Kitamura, Nagoya (JP); Yoshihide Suzuki, Toyoake (JP)

(73) Assignee: AISIN SEIKI KABUSHIKI KAISHA, Kariya-Shi, Aichi-Ken (JP)

(*) Notice: Subject to any disclaimer, the term of this patent is extended or adjusted under 35 U.S.C. 154(b) by 82 days.

(21) Appl. No.: 13/983,517

(22) PCT Filed: Mar. 21, 2012

(86) PCT No.: PCT/JP2012/057216
§ 371 (c)(1),
(2), (4) Date: Aug. 2, 2013

(87) PCT Pub. No.: WO2012/133059
PCT Pub. Date: Oct. 4, 2012

(65) Prior Publication Data
US 2013/0317683 A1 Nov. 28, 2013

(30) Foreign Application Priority Data

Mar. 25, 2011 (JP) .................. 2011-067134

(51) Int. Cl.
*B60L 9/00* (2006.01)
*B60L 11/00* (2006.01)
(Continued)

(52) U.S. Cl.
CPC .................. *B60W 20/30* (2013.01); *B60K 6/48* (2013.01); *B60L 15/2054* (2013.01);
(Continued)

(58) Field of Classification Search
CPC ..... B60W 20/30; B60W 10/02; B60W 10/06; B60W 10/08
USPC .......................................... 701/22
See application file for complete search history.

(56) References Cited

U.S. PATENT DOCUMENTS 4,986,396 A 1/1991 Morimoto
2004/0214683 A1* 10/2004 Yoshiyama et al. .......... 475/344
(Continued)

FOREIGN PATENT DOCUMENTS

EP 1 411 262 A2 4/2004
EP 1 559 923 A1 8/2005
(Continued)

OTHER PUBLICATIONS

International Search Report (PCT/ISA/210) issued on Apr. 24, 2012, by the Japanese Patent Office as the International Searching Authority for International Application No. PCT/JP2012/057216.
(Continued)

*Primary Examiner* — Imran Mustafa
(74) *Attorney, Agent, or Firm* — Buchanan Ingersoll & Rooney PC

(57) ABSTRACT

In a transmission control device for a hybrid vehicle, when an engine torque is equal to or less than a predetermined value during a constant speed traveling, a learning engine rotational speed is set to a rotational speed being higher by +α than the present engine rotational speed. Then, a learning engine torque is calculated that corresponds to the learning engine rotational speed, a learning clutch actuator operation amount is obtained that corresponds to the learning clutch torque, and a clutch actuator is operated based on the learning clutch actuator operation amount. Thereafter, when the engine rotational speed and the engine torque are in stable states, a clutch torque value corresponding to the learning clutch actuator operation amount is compensated by a stable engine torque value.

7 Claims, 8 Drawing Sheets

(51) Int. Cl.
*G05D 1/00* (2006.01)
*G05D 3/00* (2006.01)
*G06F 7/00* (2006.01)
*G06F 17/00* (2006.01)
*B60W 20/00* (2006.01)
*B60K 6/48* (2007.10)
*B60W 10/02* (2006.01)
*B60W 10/06* (2006.01)
*F02D 29/02* (2006.01)
*F02D 31/00* (2006.01)
*F16D 48/06* (2006.01)
*B60L 15/20* (2006.01)
*B60W 10/08* (2006.01)
*B60W 10/11* (2012.01)
*F02D 41/02* (2006.01)
*B60W 50/00* (2006.01)
*F02D 41/24* (2006.01)

(52) U.S. Cl.
CPC ............ *B60W 10/02* (2013.01); *B60W 10/06* (2013.01); *B60W 10/08* (2013.01); *B60W 10/11* (2013.01); *B60W 20/00* (2013.01); *F02D 29/02* (2013.01); *F02D 31/001* (2013.01); *F02D 41/022* (2013.01); *F16D 48/06* (2013.01); *B60K 2006/4808* (2013.01); *B60W 2050/0088* (2013.01); *B60W 2510/0657* (2013.01); *B60W 2600/00* (2013.01); *B60W 2710/022* (2013.01); *B60W 2710/0644* (2013.01); *B60W 2710/0666* (2013.01); *B60Y 2400/4242* (2013.01); *F02D 41/2464* (2013.01); *F02D 2250/18* (2013.01); *F16D 2500/1024* (2013.01); *F16D 2500/1066* (2013.01); *F16D 2500/50236* (2013.01); *Y02T 10/626* (2013.01); *Y02T 10/6221* (2013.01); *Y02T 10/6286* (2013.01); *Y02T 10/7275* (2013.01); *Y10S 903/93* (2013.01)

(56) References Cited

U.S. PATENT DOCUMENTS

| | | | |
|---|---|---|---|
| 2008/0039280 A1* | 2/2008 | Petzold et al. | 477/70 |
| 2010/0114442 A1 | 5/2010 | Kadota | |
| 2012/0316028 A1* | 12/2012 | Kobayashi et al. | 477/5 |
| 2013/0024057 A1* | 1/2013 | Jung et al. | 701/22 |
| 2013/0304337 A1 | 11/2013 | Terakawa et al. | |
| 2013/0310217 A1 | 11/2013 | Terakawa et al. | |
| 2013/0317683 A1 | 11/2013 | Terakawa et al. | |

FOREIGN PATENT DOCUMENTS

| | | |
|---|---|---|
| EP | 2 101 074 A2 | 9/2009 |
| JP | 01-120433 A | 5/1989 |
| JP | 01-193416 A | 8/1989 |
| JP | 2004-138176 A | 5/2004 |
| JP | 2004-176894 A | 6/2004 |
| JP | 2005-214331 A | 8/2005 |
| JP | 2009-222068 A | 10/2009 |
| JP | 2010-105649 A | 5/2010 |
| JP | 2010-143448 A | 7/2010 |
| KR | 10-2009-0111175 A | 10/2009 |
| WO | 2012/133059 A1 | 10/2012 |

OTHER PUBLICATIONS

U.S. Appl. No. 13/983,439, filed Aug. 2, 2013, Terakawa et al.
U.S. Appl. No. 13/983,479, filed Aug. 2, 2013, Terakawa et al.
Office Action issued on Jun. 17, 2014, by the Japan Patent Office in corresponding Japanese Patent Application No. 2013-507435. (3 pages).
Office Action issued on Apr. 24, 2015 by the Chinese Patent Office in corresponding Chinese Patent Application No. 201280012681.2. (5 pages).

* cited by examiner

Flowchart 2

TRANSMISSION CONTROL DEVICE FOR HYBRID VEHICLE

TECHNICAL FIELD

The present invention relates to a transmission control device for a hybrid vehicle which is provided with an internal combustion engine, a motor generator (that generates a driving force transmitted to drive wheels, from electric power stored in a battery and is driven by the drive wheels at the time of regeneration to regenerate electric power) and an automated clutch device and which appropriately controls the clutch torque as a result of learning stroke amounts at respective times of clutch engagements.

BACKGROUND ART

Heretofore, there has been known an automatic transmission (hereafter referred to as AMT (Automated Manual Transmission) that is constructed by attaching respective actuators to an existing manual transmission in a vehicle using an internal combustion engine (engine) as a driving source and that automatically performs a series of gear change operations (disconnection/connection of a clutch, gear shift and select operation) in depending on the driver's wish or the vehicle state. In the control of, for example, the clutch, the AMT performs the control by converting a clutch torque required from the vehicle property into a clutch actuator operation amount being the operation amount of a clutch actuator. The relation between the aforementioned clutch torques and clutch actuator operation amounts is obtained statically from the cushion property or the like of a clutch disc at the time of shipment. However, it has been known that in the vehicle being in use, the relation is influenced greatly by dynamic variable factors such as wear of a clutch facing, change in μ (frictional coefficient) due to heating, aged deterioration and the like.

Like this, as a change occurs in the relation between the clutch torques and the clutch actuator operation amounts, the disconnection operation and the engagement operation of the clutch at the time of a gear change in the case of the AMT becomes unable to be done at the timing as intended. For example, there arises an anxiety that if the disconnection time of the clutch becomes long beyond the time intended, the torque from the engine is not transmitted to wheels during the disconnection of the clutch, thereby making the driver feel a stall. Further, when the disconnection time of the clutch lengthens, the engine with no load imposed thereon picks up excessively, and hence, there arises another anxiety that when the clutch is brought into engagement, an excessive gear change shock is generated due to an increase in the difference between the rotational speed of the engine and the rotational speed of an input shaft of the transmission. For this reason, there has been proposed a technology in which the relation between clutch torques and operation amounts of a clutch actuator is learned appropriately to compensate a clutch torque map defining the relation (Patent Document 1 for example). In the technology disclosed in Patent Document 1, the learning is done at the time of a starting and at the time of a gear change at which the disconnection and engagement operations of a clutch are performed. Particularly, at the time of a starting, the rotational speed of an input shaft of the transmission remains almost zero, so that it is possible to acquire the relation between the clutch torques and the operation amounts of the clutch actuator which are stabilized at all times. Then, the relation between the clutch torques and the operation amounts of the clutch actuator is compensated on the basis of the acquired data, and the disconnection time of the clutch is controlled to become an appropriate time to suppress the generation of a stall feeling, the generation of a gear change shock due to the excessive pick-up of the engine, and the like.

PRIOR ART DOCUMENT

Patent Document

Patent Document 1: JP2005-214331 A

SUMMARY OF THE INVENTION

Problem to be Solved by the Invention

However, where the prior art disclosed in Patent Document 1 is attempted to be applied to, for example, a parallel hybrid vehicle or the like provided with an internal combustion engine and a motor generator and having a mode in which the vehicle is started by the motor generator only at the time of a starting, it would be impossible to learn the operation amount of the clutch actuator at the time of a starting because the engagement operation of the clutch device is not required at that time. Thus, the opportunities for the learning are decreased greatly, and this gives rise to an anxiety that accuracy is deteriorated in compensating the operation amounts of the clutch actuator to the clutch torques. Generally, in the case of hybrid vehicles, while a clutch is disconnected at the time of a gear change in the traveling by an engine, a motor generator is controlled to assist the driving force so that there is not given a stall feeling or the like. However, when the disconnection time of the clutch becomes long over an intended time due to the deterioration of the accuracy in compensating the operation amounts of the clutch actuator to the clutch torques, a difference occurs in the timing between the disconnection of the clutch and the assist by the motor generator, and this gives rise to an anxiety that a stall feeling is given and that a gear change shock is generated due to an excessive pick-up of the engine.

The present invention has been made taking the foregoing problem into consideration, and an object thereof is to provide a transmission control device capable of learning an operation amount of a clutch actuator at other timings than the time of a starting and hence, of improving the accuracy in compensating the operation amount of the clutch actuator.

Measures for Solving the Problem

In order to solve the aforementioned problem, a transmission control device for a hybrid vehicle in a first aspect of the present invention comprises an automatic transmission that gear-changes at a plurality of gear ratios the rotation of an input shaft which is adapted to be rotated by an engine torque outputted by an engine mounted on the vehicle, and transmits the rotation to an output shaft rotationally coupled to drive wheels of the vehicle; a clutch that connects or disconnects an output shaft of the engine with respect to the input shaft of the automatic transmission by the operation of a clutch actuator and controls a clutch torque transmitted from the output shaft to the input shaft to a target clutch torque; a clutch torque to operation amount storage section that stores a correspondence relation between clutch actuator operation amounts of the clutch actuator for controlling the clutch torque of the clutch and clutch torques; a clutch control section that obtains a clutch actuator operation amount of the clutch actuator corresponding to a required target clutch torque, from the clutch torque to operation amount storage section and operates the clutch actuator through the clutch actuator operation amount to control the clutch torque to the target clutch torque; a correspondence relation compensating section that learns and compensates the correspondence relation between the clutch actuator operation amounts and the clutch toques stored in the clutch torque to operation amount storage section; an engine rotational speed detecting section that detects the rotational speed of the engine; an engine output control operation amount detecting section that detects an operation amount of an engine output control section that controls the output of the engine; an engine torque detecting section that detects an engine torque from an engine output control operation amount detected by the engine output control operation amount detecting section and an engine rotational speed detected by the engine rotational speed detecting section, based on a relation between rotational speeds of the engine and engine toques at respective operation amounts of the engine output control section; and a motor rotationally coupled to the input shaft or the output shaft of the automatic transmission; wherein the correspondence relation compensating section comprises a low torque detecting section that detects that the engine torque detected by the engine torque detecting section is a low torque being a predetermined value or less when the output shaft of the engine and the input shaft of the automatic transmission are in a complete engagement state; a learning engine rotational speed setting section that sets a learning engine rotational speed being slightly higher than the present engine rotational speed; a learning clutch actuator operation amount calculating section that calculates a learning clutch actuator operation amount corresponding to a learning clutch toque being equal to a learning engine torque which is detected by the engine torque detecting section in correspondence to the learning engine rotational speed, with the engine output control section having the present engine output control operation amount; a clutch actuator learning operating section that operates the clutch actuator through the learning clutch actuator operation amount; and a clutch torque to operation amount compensating section that, if the difference between an actual engine rotational speed detected by the engine rotational speed detecting section when the clutch actuator is operated through the learning clutch actuator operation amount, and the learning engine rotational speed is equal to or less than a tolerable value, replaces a clutch torque value corresponding to the learning clutch actuator operation amount by an engine torque which is detected by the engine torque detecting section when the clutch actuator is operated through the learning clutch actuator operation amount, in the clutch torque to operation amount storage section.

In order to solve the aforementioned problem, a transmission control device for a hybrid vehicle in a second aspect of the present invention comprises an automatic transmission that gear-changes at a plurality of gear ratios the rotation of an input shaft which is adapted to be rotated by an engine torque outputted by an engine mounted on the vehicle, and transmits the rotation to an output shaft rotationally coupled to drive wheels of the vehicle; a clutch that connects or disconnects an output shaft of the engine with respect to the input shaft of the automatic transmission by the operation of a clutch actuator and controls a clutch torque transmitted from the output shaft to the input shaft to a target clutch torque; a clutch torque to operation amount storage section that stores a correspondence relation between clutch actuator operation amounts of the clutch actuator for controlling the clutch torque of the clutch and clutch torques; a clutch control section that obtains a clutch actuator operation amount of the clutch actuator corresponding to a required target clutch torque, from the clutch torque to operation amount storage section and operates the clutch actuator through the clutch actuator operation amount to control the clutch torque to the target clutch torque; a correspondence relation compensating section that learns and compensates the correspondence relation between the clutch actuator operation amounts and the clutch toques stored in the clutch torque to operation amount storage section; an engine rotational speed detecting section that detects the rotational speed of the engine; an engine output control operation amount detecting section that detects an operation amount of an engine output control section that controls the output of the engine; an engine torque detecting section that detects an engine torque from an engine output control operation amount detected by the engine output control operation amount detecting section and an engine rotational speed detected by the engine rotational speed detecting section, based on a relation between rotational speeds of the engine and engine toques at respective operation amounts of the engine output control section; and a motor rotationally coupled to the input shaft or the output shaft of the automatic transmission; wherein the correspondence relation compensating section comprises a low torque detecting section that detects that the engine torque detected by the engine torque detecting section is a low torque being a predetermined value or less when the output shaft of the engine and the input shaft of the automatic transmission are in a complete engagement state; a learning engine rotational speed setting section that sets a learning engine rotational speed being slightly higher than the present engine rotational speed; a learning clutch actuator operation amount calculating section that calculates a learning engine torque which is detected by the engine torque detecting section in correspondence to the learning engine rotational speed, with the engine output control section having the present engine output control operation amount, and upper and lower learning engine torques putting the learning engine torque at a center therebetween and that calculates lower and upper learning clutch actuator operation amounts which correspond to upper and lower learning clutch torques being equal to the upper and lower learning engine torques; a clutch actuator learning operating section that operates the clutch actuator from the lower learning clutch actuator operation amount toward the upper learning clutch actuator operation amount until the engine rotational speed becomes the learning engine rotational speed; and a clutch torque to operation amount compensating section that replaces the clutch actuator operation amount when the engine rotational speed becomes equal to the learning engine rotational speed, as a learning clutch actuator operation amount which corresponds to a learning clutch torque being equal to the learning engine torque, in the clutch torque to operation amount storage section.

FORMS FOR PRACTICING THE INVENTION

Figure 1:
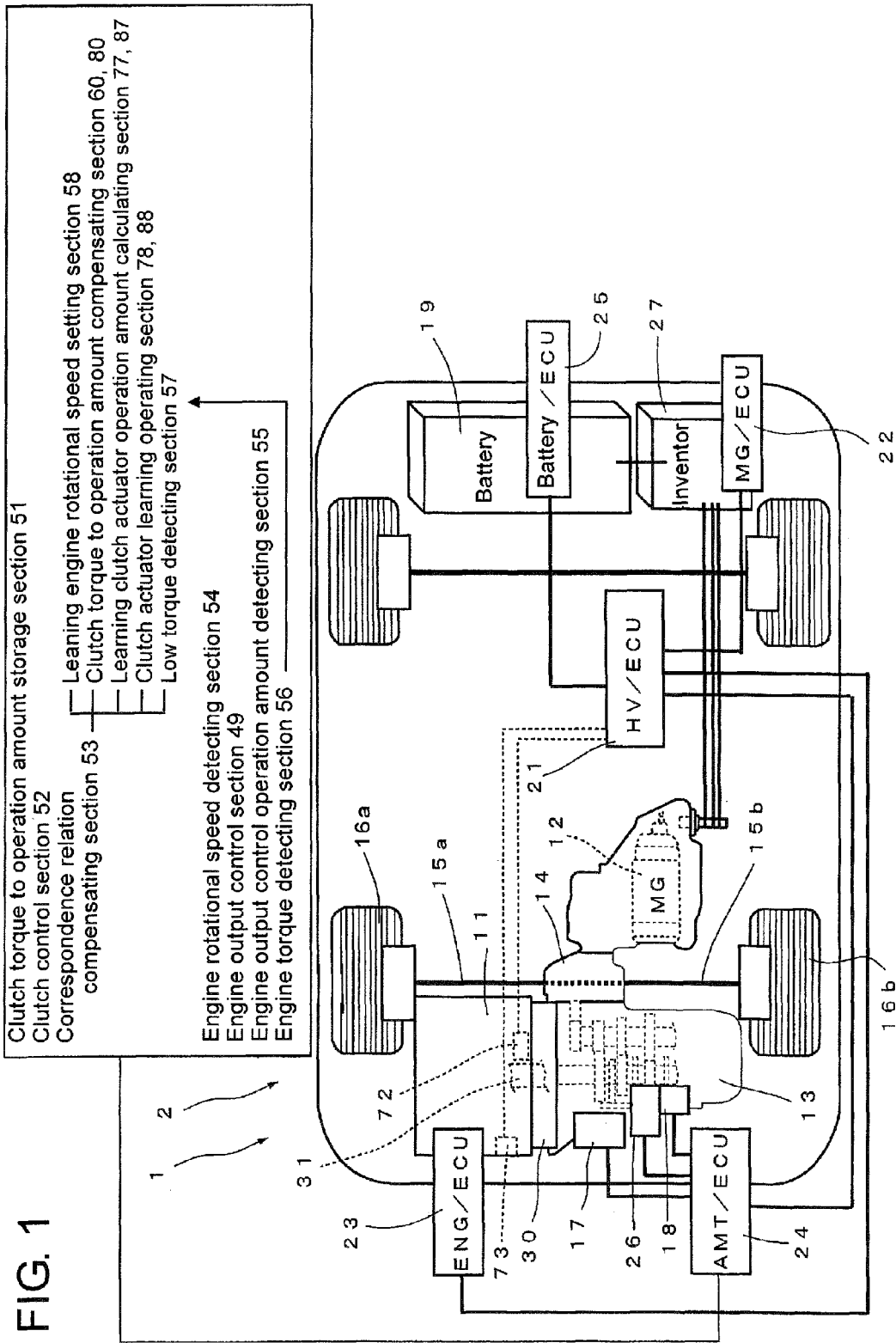
FIG. 1 is a schematic construction diagram of a hybrid vehicle including a transmission control device according to the present invention.

Hereafter, a first embodiment for practicing the present invention will be described in detail with reference to the drawings. FIG. 1 is a block diagram showing the construction of a hybrid vehicle to which the present invention is applicable. The hybrid vehicle 1 shown in FIG. 1 takes a construction that there are provided an engine 11 and a motor generator (corresponding to the motor in the present invention and hereinafter referred to as "MG") 12 driven by the electricity charged in a battery 19 and that the prime movers of two kinds are mounted and arranged in parallel to be able to drive wheels by the respective prime movers.

Figure 2:
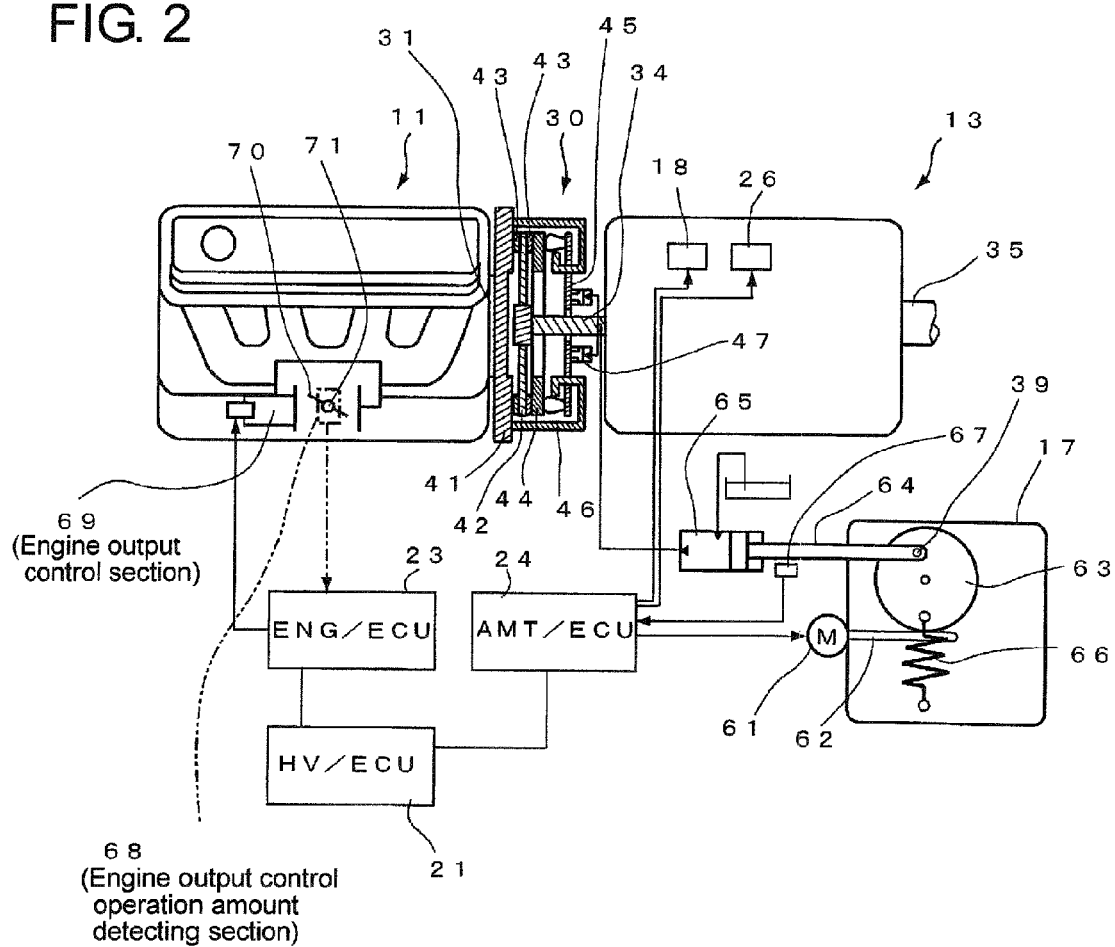
FIG. 2 is a schematic construction diagram of an engine, an automatic transmission and a clutch device in FIG. 1.

Further, the hybrid vehicle 1 is provided with an automatic transmission 13 (corresponding to the automatic transmission in the present invention) rotationally connected to an output shaft 31 (corresponding to the output shaft in the present invention) of the engine 11 shown in FIGS. 1 and 2 for gear-changing the rotational speed of the output shaft 31 at gear ratios of a plurality of gear change stages, a clutch device 30 (corresponding to the clutch in the present invention) for controlling the connection/disconnection between the output shaft 31 of the engine 11 and an input shaft 34 of the automatic transmission 13 and for controlling to a target clutch torque the clutch torque transmitted from the output shaft 31 to the input shaft 34, a differential gear (differential) 14 shown in FIG. 1, drive shafts 15a, 15b, and drive wheels 16a, 16b.

Further, the hybrid vehicle 1 is provided with a HV/ECU (Hybrid Vehicle Electronic Control Unit) 21 for governing the control of the whole vehicle, an MG/ECU 22 for instructing the driving or regeneration to the MG 12, an inverter 27 for supplying electricity to the MG 12, an ENG/ECU 23 for controlling the stopping and combustion of the engine 11, an AMT/ECU 24 connected to a clutch actuator 17, a shift actuator 18 and a sect actuator 26 which are incorporated in the automatic transmission 13, for controlling the respective actuators 17, 18, 26 to perform an optimum gear change, and a battery ECU 25 for controlling the charging state of the battery 19 connected to the inverter 27. The MG/ECU 22, the EGN/ECU 23, the AMT/ECU 24 and the battery ECU 25 are connected to the HV/ECU 21 through a CAN, and each of them is governed and controlled by the HV/ECU 21.

The respective ECUs 21, 22, 23, 24 and 25 are provided with respective control sections (not shown) each composed of a CPU (processing unit) for performing calculations, a ROM, a RAM, an EEPROM capable of holding data with a backup power supply, and the like (all not shown). In the control section, the CPU executes calculation processing based on various control programs and maps stored in the ROM. The ROM is a memory storing the various control programs, the maps to which references are made in executing these programs, and the like. The RAM constitutes a memory that temporarily stores the results of calculations by the control section, data inputted from outside and the like, and the EEPROM comprises a nonvolatile memory for keeping the stored data and the like.

The CPU, the ROM, the RAM and the EEPROM of the control section are mutually connected through buses and are connected to an input interface and an output interface (both not shown).

The hybrid vehicle 1 constructed like this according to the first embodiment is started by the MG 12 only at the time of a starting and, where a deficiency occurs of the driving force by the MG 12, makes the engine 11 to start by an ignition switch 73 for ignition provided in the engine 11. Thus, the traveling can be done by the both driving forces from the MG 12 and the engine 11 or by the driving fore by the engine 11 only.

Then, a transmission control device 2 according to the present invention is constructed by the engine 11, the automatic transmission 13, the clutch device 30, the MG 12 (motor generator), the HV/ECU 21, and the AMT/ECU 24. Further, the transmission control device 2 is controlled by an engine output control section 49, a clutch torque to operation amount storage section 51, a clutch control section 52, a correspondence relation compensating section 53, an engine rotational speed detecting section 54, an engine output control operation amount detecting section 55 and an engine torque detecting section 56 which are included in the AMT/ECU 24.

Further, the AMT/ECU 24 has various sensors such as ignition switch 73, engine rotational speed sensor 72 and the like referred to later connected thereto through the HV/ECU 21 and also has connected thereto the clutch actuator 17, the shift actuator 18, the select actuator 26, a stroke sensor 67 and the like. Then, the AMT/ECU 24 takes therein detection signals from the aforementioned various sensors to detect the vehicle state (ON/OFF state of the ignition switch 73, engine rotational speed Ne, clutch actuator operation amount Sa and the like). Then, based on the detected vehicle state and the driver's will, the AMT/ECU 24 performs a gear change operation by driving the clutch actuator 17, the shift actuator 18 and the select actuator 26 and performs a learning control for clutch actuator operation amounts Sa according to the present invention by driving the clutch actuator 17 only.

Next, description will be made regarding the engine 11, the automatic transmission 13, the MG 12, the clutch device 30, the HV/ECU 21, and the AMT/ECU 24 that constitute the transmission control device 2. Detailed description of the MG 12 will be omitted because the same is a three-phase electric motor which is conventionally employed in hybrid vehicles.

As shown in FIG. 2, the clutch device 30 is assembled to the output shaft 31 of the engine 11, and the output shaft 31 and the input shaft 34 of the automatic transmission 13 are coupled through the clutch device 30. The clutch device 30 is a friction clutch with a single dry-type disc.

The engine 11 is provided with a throttle valve 70 constituting the engine output control section 49 that regulates the volume of intake air to control the output of the engine 11, a throttle sensor 68 (constituting the engine output control operation amount detecting section 55 in the present invention) for detecting the opening degree of the throttle valve 70 (throttle opening degree) being the engine output control operation amount in the present invention, and a throttle actuator 69 (constituting the engine output control section in the present invention) for driving the throttle valve to be opened or closed. The throttle sensor 68 and the throttle actuator 69 are connected to the ENG/ECU 23. Then, the ENG/ECU 23 controls the throttle actuator 69 in response to a command from the HV/ECU 21. Further, a throttle opening-degree signal from the throttle sensor 68 is transmitted to the ENG/ECU 23. FIG. 2 is not so depicted that the throttle actuator 69 opens and closes the throttle valve 70. However, FIG. 2 is a schematic illustration, and in fact, the throttle actuator 69 is constructed to turn a throttle shaft 71 being a rotational shaft of the throttle valve 70 about an axis.

As shown in FIG. 1, an engine rotational speed sensor 72 of the non-contact type for detecting the rotational speed of the output shaft 31 is provided in the vicinity of the output shaft 31 of the engine 11. Further, there is provided an accelerator opening-degree sensor for detecting the stepping amount of an accelerator pedal (not shown). Thus, when the driver steps on the accelerator pedal (not shown) or releases the same, an accelerator opening-degree signal is transmitted from the accelerator opening-degree sensor to the HV/ECU 21, and when the engine 11 is in the operation state, the HV/ECU 21 transmits a command value to the ENG/ECU 23 in dependence on a value of the accelerator opening-degree signal transmitted thereto. The ENG/ECU 23 operates the throttle actuator 69 in response to the command value to open or close the throttle vale 70 and controls the output of the engine 11 and the engine rotational speed Ne while observing the rotational speed of the output shaft 31 by the engine rotational speed sensor 72.

In the present embodiment, there is taken a construction that the engine rotational speed Ne is not controlled by the stepping amount only of the accelerator pedal stepped on by the driver and is controllable by operating the throttle actuator 69 regardless of the stepping amount of the accelerator pedal upon request from the HV/ECU 21.

Next, the clutch device 30 (corresponding to the clutch in the present invention) will be described. The clutch device 30 is constituted in the form of including a flywheel 41 secured to the output shaft 31 of the engine 11, a clutch disc 42 securing clutch facings 43 to opposite surfaces at an outer periphery thereof and spline-coupled to the input shaft 34 of the automatic transmission 13 to rotate bodily therewith, a pressure plate 44, a diaphragm spring 45, a clutch cover 46, and hydraulic direct cylinders (concentric slave cylinders) 47 which constitute a clutch assembly secured to the flywheel 41.

The clutch device 30 is constructed to be able to increase or decrease the rotation transmission amount between the flywheel 41 and the clutch disc 42 by changing a pressuring load of the clutch disc 42 against the flywheel 41 through the hydraulic direct cylinders 47, the diaphragm spring 45 and the pressure plate 44, so that it is possible to control the clutch torque Tc to a target clutch torque. The target clutch means a clutch torque which is requested from the AMT/ECU 24 in dependence on the vehicle running state. Then, the target clutch torque is attained as a result that the AMT/ECU 24 controls the actuator operation amount Sa of the clutch actuator 17 based on the clutch torque to clutch actuator operation amount map shown in FIG. 3. Specifically, this can be realized as a result that the AMT/ECU 24 controls the operation amount in the axial direction of an output rod 64 constituting the clutch actuator 17 referred to later. At this time, the operation amount of the output rod 64 is detected by a stroke sensor 67 of the non-contact type provided in the vicinity of the output rod 64. In the present embodiment, the stroke sensor 67 is a rotational angle sensor constituted by a Hall IC and is connected to the AMT/ECU 24, so that data of the clutch actuator operation amount Sa detected by the stroke sensor 67 is transmitted to the AMT/ECU 24.

Next, the clutch actuator 17 will be described. As shown in FIG. 2, the clutch actuator 17 is constructed by being constructed with a direct-current electric motor 61, a reduction gear 62, an output wheel 63, the output rod 64, a master cylinder 65, and an assist spring 66.

The reduction gear 62 comprises a worm gear formed on an output shaft of the direct-current electric motor 61, and the output wheel 63 is driven through the reduction gear 62 by the driving of the direct-current electric motor 61. Then, by the rotation of the output wheel 63, the output rod 64 coupled to the output wheel 63 through a pivot pint 39 is moved (through a stroke back and forth) forward (leftward in FIG. 2) or backward (rightward in FIG. 2) to operate the master cylinder 65. Then, the oil pressure generated by the operation of the master cylinder 65 is supplied to the hydraulic direct cylinders 47 constituting the clutch device 30. The assist spring 66 is coupled to the output wheel 63 and generates an assist force in a direction (counterclockwise in FIG. 2) to disconnect the clutch device 30 (to disengage the clutch), so that the output wheel 63 is constructed to be rotatable by a smaller force in the output (torque) of the direct-current electric motor 61.

For example, in the initial state shown in FIG. 2 of the clutch actuator 17, a pressing load is imposed on the pressure plate 44 through the output rod 64, the hydraulic direct cylinders 47 and the diaphragm spring 45 that generates a spring reaction force (the force urging the pressure plate 44 in the direction toward the flywheel 41) for the clutch device 30. Thus, the clutch disc 42 receives the pressing load toward the flywheel 41 and is brought into complete engagement with the flywheel 41 to become the state in which it is able to completely transmit the rotation from the engine 11 side.

Figure 3:
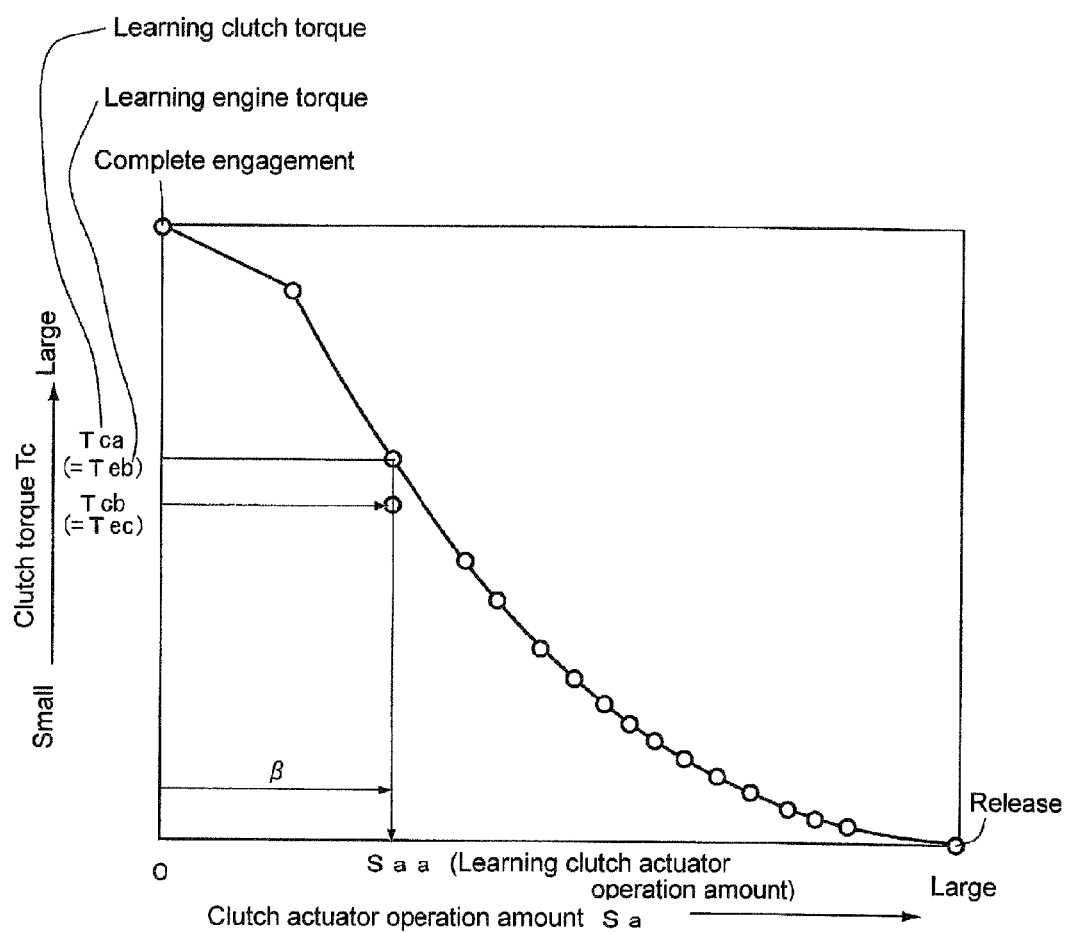
FIG. 3 is a clutch torque map showing the relation between clutch torques and clutch actuator operation amounts according to a first embodiment.

On the other hand, when the leftward movement in FIG. 2 of the output rod 64 operates the hydraulic direct cylinders 47, the inner peripheral portion of the diaphragm spring 45 is deformed to weaken the urging force at the outer peripheral portion of the diaphragm spring 45 pressing the pressure plate 44, and hence, the pressing load of the clutch disc 42 against the flywheel 41 is decreased. Then, between the flywheel 41 and the clutch disc 42, a slipping is generated in dependence on the magnitude of the clutch actuator operation amount Sa of the output rod 64 to turn into a so-called half-clutch state, and the engine rotational speed Ne and the engine torque Te are transmitted to the input shaft 34 of the automatic transmission 31 with themselves decreased in dependence on the state of the half-clutch. FIG. 3 is a clutch torque map showing the correspondence relation in the initial state (vehicle shipment state) between clutch actuator operation amounts Sa and engine torques Te (=clutch torques Tc) which are transmitted to the input shaft 34 of the automatic transmission 13 at respective times of the clutch actuator operation amounts Sa, and the map is stored in the ROM of the AMT/ECU 24 (corresponding to the clutch torque to operation amount storage section 51).

In FIG. 3, the left end indicates a complete engagement state that the flywheel 41 and the clutch disc 42 are in complete engagement, while the right end indicates the point where the flywheel 41 and the clutch disc 42 are completely disconnected to reach a release state.

Next, the automatic transmission 13 will be described. The automatic transmission 13 is a so-called AMT (Automated Manual Transmission) in which gear changes are automated by attaching to an existing manual transmission the clutch device 30 which is controlled to be engaged or released by the operation of the clutch actuator 17. The automatic transmission 13 is, for example, a shaft-parallel gear transmission with five forward stages and one reverse stage, is provided with the input shaft 34 and an output shaft 35 and is also provided with gear trains having gear ratios of plural stages.

The input shaft 34 of the automatic transmission 13 is coupled to receive a drive power (clutch torque Tc) transmittable thereto from the clutch device 30 side, and the output shaft 35 is coupled to be able to transmit the drive power to the drive shafts 15a, 15b of the vehicle through the differential gear (differential) 14 (refer to FIG. 1). Thus, the clutch torque Tc is increased or decreased at the gear change stages and is transmitted to the drive shafts 15a, 15b and the drive wheels 16a, 16b by way of the differential gear (differential) 14 to drive the vehicle. Further, the output of the MG 12 is also able to drive the vehicle independently by way of the differential gear (differential) 14.

The automatic transmission 13 is provided with a group of gear change actuators (the clutch actuator 17, the shaft actuator 18 and the select actuator 26 all aforementioned) which are connected to the AMT/ECU 24 and which are controlled by the AMT/ECU 24 for operating the switching of the gear change stages.

The AMT/ECU 24 has gear change curves set for respective gear change stages. At the time of a gear change in the automatic transmission 13, the clutch actuator 17 is operated when the engine rotational speed Ne (or the output shaft rotational speed of the automatic transmission) reaches a rotational speed specified by a gear change curve at each gear change stage. The clutch actuator 17 moves the output rod 64 toward the left in FIG. 2 and operates the master cylinder 65 and the hydraulic direct cylinders 47 to disconnect the engagement between the flywheel 41 and the clutch disc 42 of the clutch device 30.

Thereafter, the AMT/ECU 24 properly drive the shift actuator 18 and the select actuator 26 to execute the switching of the gear trains (gear change stages) of the automatic transmission 13. The AMT/ECU 24 drives the throttle actuator 69 to operate the throttle valve 70, and thus, the engine rotational speed Ne is regulated to an engine rotational speed Ne which is suitable to the gear change stage of gears established after the gar change as well as to the vehicle speed (or the output shaft rotational speed of the automatic transmission 13) at that time. At this time, the clutch device 30 drives the clutch actuator 17 to regulate the clutch torque Tc thereby to establish a half-clutch state that enables the engine rotational speed Ne, the gear change stage of the gears after the gear change and the vehicle speed at that time to match favorably, and finishes the gear change by finally bringing the flywheel 41 and the clutch disc 42 into complete engagement.

In the foregoing embodiment, detailed description regarding the driving methods for the shift actuator 18 and the select actuator 26 will be omitted because the methods are well-known (refer to JP 2004-176894 A). Further, detailed description will be omitted regarding the gear change curves and the method of changing the gear change stages by the use of the gear change curves because of being well-known.

The HV/ECU 21 overall controls the whole of the hybrid vehicle 1, and the AMT/ECU 24 is provided with the engine output control section 49, the clutch torque to operation amount storage section 51, the clutch control section 52, the correspondence relation compensating section 53, the engine rotational speed detecting section 54, the engine output control operation amount detecting section 55 and the engine torque detecting section 56 which constitute the transmission control device 2 (refer to FIG. 1).

Further, the correspondence relation compensating section 53 is provided with a low torque detecting section 57, a learning engine rotational speed setting section 58, a learning clutch actuator operation amount calculating section 77, a clutch actuator learning operating section 78, and a clutch torque to operation amount compensating section 60. The AMT/ECU 24 is appropriately learns and compensates the correspondence relation between the clutch actuator operating amounts Sa and the clutch torques Tc in the clutch device 30 by these respective sections (refer to FIGS. 1 and 5).

The clutch torque to operation amount storage section 51 stores in the ROM a clutch torque Tc to clutch actuator operation amount Sa map shown in FIG. 3 representing a correspondence relation between clutch actuator operation amounts Sa and clutch torques Tc and also stores a correspondence relation between the compensated clutch actuator operation amounts Sa and the clutch torques Tc. The map in FIG. 3 has a plurality of mapped points (coordinates) that are specified by a plurality of predetermined clutch torques Tc and clutch actuator operation amounts Sa calculated and set in correspondence thereto, and those points between every adjoining mapped points are formed through a linear interpolation. The clutch torque Tc to clutch actuator operation amount Sa map is the property the vehicle possesses in the state of shipment. Thus, as the hybrid vehicle 1 runs for a long period of time, the relation of the clutch torques Tc to the clutch actuator operation amounts Sa changes due to the wear on the clutch facings 43 fixed to the opposite surfaces at the outer periphery of the clutch disc 42 with the lapse of time and the change of μ (friction coefficient) caused by heat generation, and the like.

Accordingly, in the present invention, the relation between the clutch torques Tc and the clutch actuator operation amounts Sa is properly learned with the engine torque Te remaining in a low torque range during a steady or constant speed traveling and is compensated in dependence on the result of the learning. Specifically, the learning is performed with the engagement of the clutch device 30 slipped slightly when the constant speed traveling state is established by being driven on a flat road by the engine 11 which is started after the hybrid vehicle 1 is started by the MG 12 and when the engine torque Te is a low torque. Because the learning is performed like this with a slight slipping made in the clutch device 30 in the state that the engine torque Te is a low torque, a shock is hard to be transmitted to the driver, thereby avoiding any risk of influencing the drivability.

In order to obtain a desired target clutch torque demanded by the vehicle, the clutch control section 52 calculates a clutch actuator operation amount Sa to be controlled for the clutch actuator 17, form the clutch torque to operation amount storage section 51. Then, the calculated clutch actuator operation amount Sa data is transmitted to the AMT/ECU 24 and causes the AMT/ECU 24 to drive the clutch actuator 17 to operate the output rod 64 by a corresponding clutch actuator operation amount Sa, so that the clutch torque is controlled to become the target clutch torque.

The engine rotational speed detecting section 54 detects the engine rotational speed Ne by the engine rotational speed sensor 72 provided for the output shaft 31 of the engine 11. Further, the engine output control operation amount detecting section 55 is provided with the throttle sensor 68 and detects the throttle opening degree (engine output control operation amount) of the throttle valve 70 (constituting the engine output control section 49) that controls the engine torque Te, by the throttle sensor 68.

The engine torque detecting section 56 detects an engine torque Te from the throttle opening degree detected by the engine output control operation amount detecting section 55 and the engine rotational speed Ne detected by the engine rotational speed detecting section 54, based on the relation (refer to FIG. 6) which is beforehand prepared and stored in the ROM of the HV/ECU 21 and which is established between engine rotational speeds Ne at respective throttle opening degrees being respective operation amounts for the engine output control operation amount and the engine torques Te.

The correspondence relation compensating section 53 has the low torque detecting section 57, the learning engine rotational speed setting section 58, the learning clutch actuator operation amount calculating section 77, the clutch actuator learning operating section 78, and the clutch torque to operation amount compensating section 60. As shown in a control state chart in FIG. 4, the low torque detecting section 57 first detects an engine torque Te by the engine torque detecting section 56 when the clutch device 30 is in a complete engagement state (the left in FIG. 4) after the starting of the engine 11. It is confirmed by the low torque detecting section 57 whether or not the detected engine torque Te is lower than a predetermined engine toque value (in the present embodiment, set to an engine torque value of one fifth (⅕) of the torque at time of the full power of the engine 11), and if being low is confirmed, judgment is made that the learning condition is satisfied, and the control is advanced.

Further, the learning engine rotational speed setting section 58 sets a learning engine rotational speed LNe that is higher slightly or by +α rpm for example than the present engine rotational speed Ne (=the input shaft rotational speed of the automatic transmission 13) detected by the engine rotational speed detecting section 54. In this case, although a may be set to any value, it is preferable to be set so that the driver is not given any shock or an uncomfortable feeling such as stall feeling or the like by causing the clutch device 30 to slip for the purpose of obtaining the learning engine rotational speed LNe.

Figure 6:
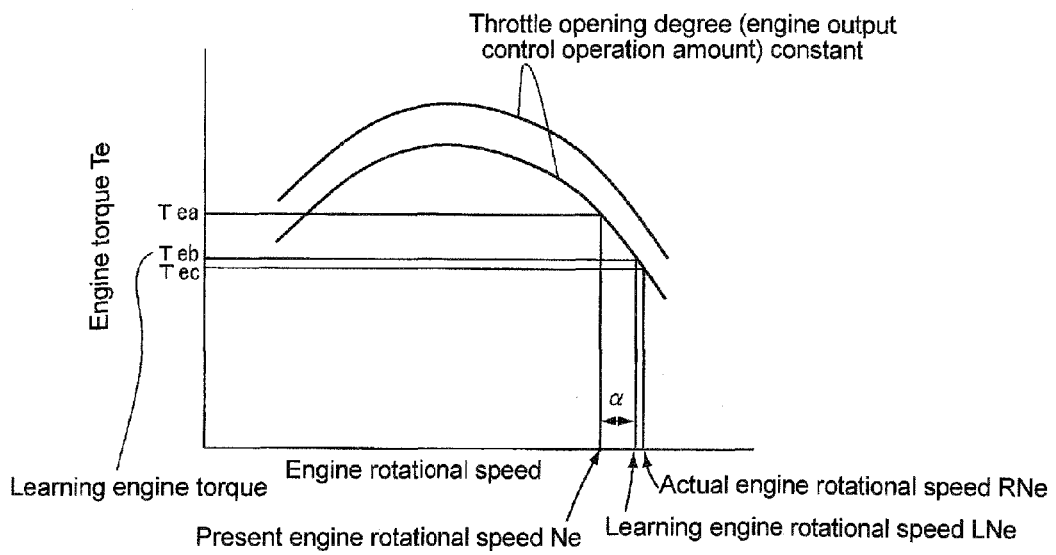
FIG. 6 is a graph of engine torque to engine rotational speed when the engine output control operation amount is fixed, according to the first embodiment.

The learning clutch actuator operation amount calculating section 77 calculates a learning engine torque Teb corresponding to the learning engine rotational speed LNe, based on the engine torque detecting section 56 shown in FIG. 6 with the present throttle opening degree (engine output control operation amount) maintained in the throttle vale 70 (engine output control section 49). Then, the section 77 calculates a learning clutch actuator operation amount Saa which corresponds to a learning clutch torque Tca being equal to the learning engine torque Teb. Thereafter, the clutch actuator learning operating section 78 operates the clutch actuator 17 by the learning clutch actuator operation amount Saa (refer to FIG. 3). As a result, a slipping takes place in the engagement of the clutch 30 to raise the engine rotational speed Ne.

Then, the clutch torque to operation amount compensating section 60 confirms that the difference between the raised actual engine rotational speed RNe detected by the engine rotational speed detecting section 54 and the learning engine rotational speed LNe is equal to or less than a tolerable value. With this condition satisfied, the clutch torque to operation amount compensating section 60 replaces the value of the clutch torque Tc corresponding to the learning clutch actuator operation amount Saa by the actual engine torque Tec in the correspondence relation between the clutch actuator operation amounts Sa and the clutch torques Tc in the clutch torque to operation amount storage section 51 and stores the replaced value in the RAM to compensate the map in FIG. 3.

Figure 5:
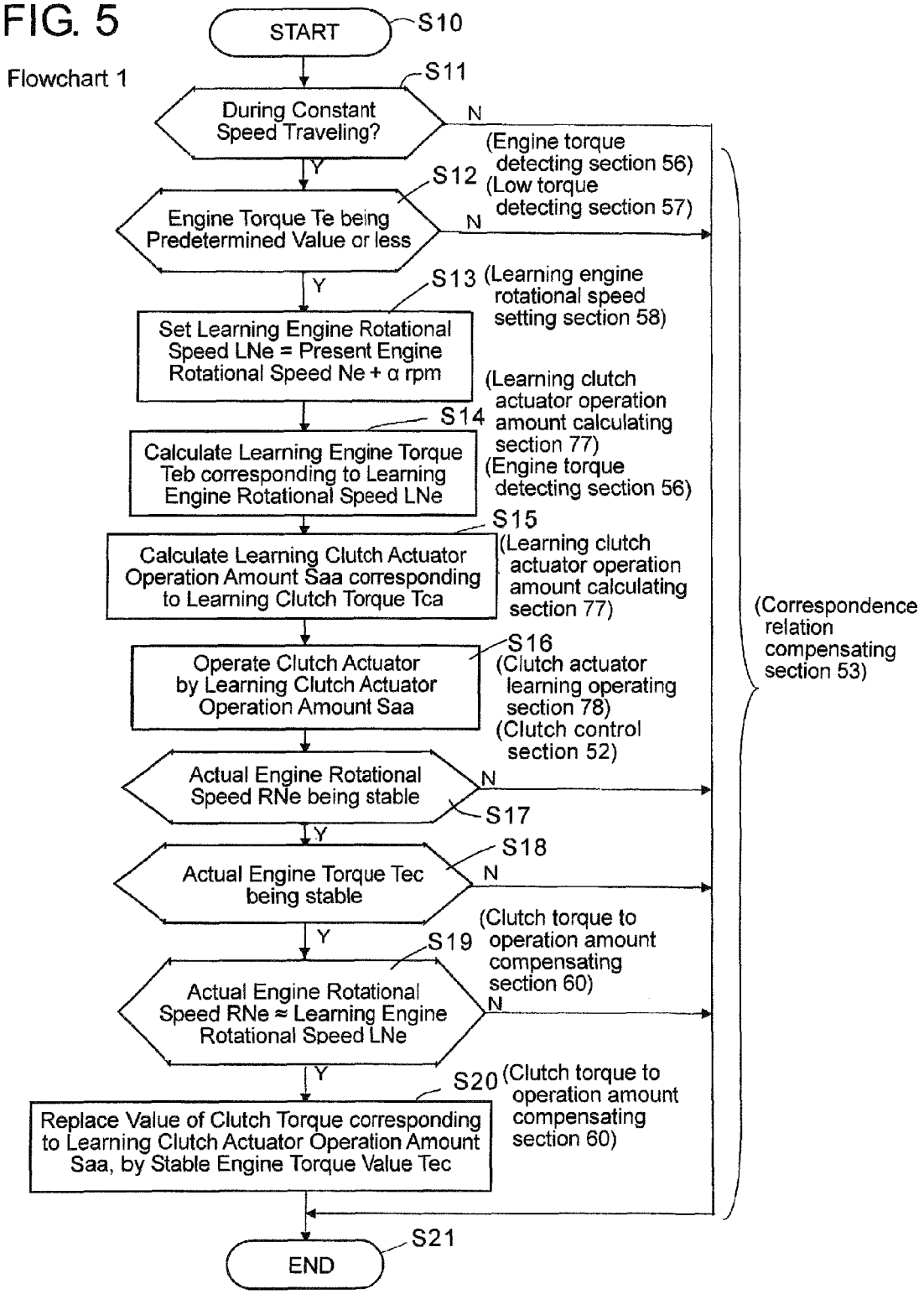
FIG. 5 is Flowchart 1 according to the first embodiment.

Next, the control of the transmission control device 2 according to the present invention will be described with reference to Flowchart 1 in FIG. 5. Flowchart 1 starts with the starting of the hybrid vehicle 1 (step S10). In the present embodiment, as mentioned earlier, the hybrid vehicle 1 is started by the MG 12 at the time of a starting. Thus, at the time of a starting, the engine 11 has not been started with the clutch device remaining disengaged. Then, for example, when the battery 19 for driving the MG 12 is short in the charge quantity or when the driver demands an acceleration by stepping the accelerator pedal, the HV/ECU 21 transmits a command to the EGN/ECU 23, whereby the ignition switch 73 is turned to ON to start the engine 11. Then, in this state, it is confirmed at step S11 whether or not the hybrid vehicle 1 is driven by the engine 11 at a fixed vehicle speed with the clutch device 30 made in complete engagement, that is, whether or not the vehicle 1 is during a constant speed traveling.

Then, because the learning cannot be performed appropriately unless the vehicle is during a constant speed traveling, the program is moved to step S21 to be terminated and is returned to step S10. If being during a constant speed traveling is judged at step S11, step S21 is reached. Then, it is judged by the low torque detecting section 57 whether the present engine torque Te detected by the engine torque detecting section 56 is equal to or less than a predetermined value or not. At this time, the predetermined value in the present invention is set to ⅕ (e.g., 30 N·m) of the maximum engine torque Temax (e.g., 150 N·m) of the engine 11. However, without being limited to ⅕, it may be in the range of ⅕ to ¼. The predetermined value being in the range of ⅕ to ¼ of the maximum engine torque Temax is one that was obtained by the inventors through experiments, and is a value that is varied in dependence on an engine used. Then, in the present embodiment, a value that enables the learning to be made most stably is ⅕ or less of the maximum engine torque Temax. The predetermine value may arbitrarily be set unless it influences the drivability in bringing the clutch device 30 according to the present invention into a half-clutch state or into engagement again.

Then, the program is moved to step S13 if the present engine torque Te is ⅕ or less of the maximum engine torque Temax. If ⅕ is exceeded, step S21 is reached to terminate the program, and return is made to step S10.

At step S13, the value a that is used in making the learning engine rotational speed LNe equal to "the present engine rotational speed Ne+α rpm" is set by the learning engine rotational speed setting section 58.

At step S14 (the learning clutch actuator operation amount calculating section 77), the engine torque detecting section 56 shown in FIG. 6 calculates the learning engine torque Teb corresponding to the learning engine rotational speed LNe.

At step S15 (the learning clutch actuator operation amount calculating section 77), the learning clutch actuator operation amount Saa corresponding to the learning clutch torque Tca being equal to the learning engine torque Teb is calculated by using the map in FIG. 3 possessed by the clutch torque to operation amount storage section 51.

At step S16 (the clutch actuator learning operating section 78), by the use of the clutch control section 52, the output rod 64 of the clutch actuator 17 is operated in such a quick motion that the shock does not become great, to a position which is close to but not beyond the end position of the learning clutch actuator operation amount Saa, and is then adjusted to be moved slowly to the end position of the learning clutch actuator operation amount Saa so that the actual engine rotational speed RNe becomes nearly equal to the learning engine rotational speed LNe. At this time, the adjustment may not be done from the position which is close to but not beyond the end position of the learning clutch actuator operation amount Saa, but may be done after the output rod 64 is overshot.

At step S17, judgment is made of whether or not the actual engine rotational speed RNe which has been controlled to become the learning engine rotational speed LNe is stably kept for a predetermined period of time within a predetermined band. Because the learning is executed accurately when the actual engine rotational speed RNe is kept fixed for the predetermined period of time, the step S18 is reached in the case of Y. In the case of N, since the learning cannot be executed appropriately, the program is terminated at step S21. The predetermined period of time and the predetermined band may be set arbitrarily.

At step S18, it is confirmed whether the engine torque Tec at that time is stable or not (refer to FIG. 6). The engine torque Tec is calculated from the graph in FIG. 6. At this time, it has been confirmed at step S17 that the actual engine rotational speed RNe is kept fixed. Therefore, at step S18, by confirming the stability of the engine torque Tec, it is confirmed whether the throttle opening degree is fixed or not. Then, the program is moved to step S19 if the engine torque Tec has been stable for the predetermined period of time within the predetermined band, but is terminated unless the stability is kept. The predetermined period of time and the predetermined band may be set arbitrarily.

At step S19 (the clutch torque to operation amount compensating section 60), it is confirmed whether or not the difference between the actual engine rotational speed RNe and the learning engine rotational speed LNe indicated in FIG. 6 is equal to a tolerable value or less. In this case, the tolerable value may be set arbitrarily. Then, the program is advanced to step S20 if the difference is equal to the tolerable value or less, but is terminated if the difference is over the tolerable value.

At step S20 (the clutch torque to operation amount compensating section 60), the value Tca of the clutch torque (the learning clutch torque) corresponding to the learning clutch actuator operation amount Saa (β) is replaced by the value Tec of a stable engine torque Te to be set as Tcb, whereby compensation is made as to the correspondence relation (the map) of FIG. 3 between the clutch actuator operating amounts Sa and the clutch torques Tc. Then, at the time of the next gear change, the control of the clutch torque Tc by operating the clutch device 30 is executed based on the data so compensated.

As is clear from the foregoing description, in the present embodiment, if the engine torque is judged by the low torque detecting section 57 to be a low torque which is equal to less than the predetermined value (being a value in the range of ⅕ to ¼ of the maximum engine torque Temax and, in the present embodiment, set to ⅕), first the learning engine rotational speed setting section 58 sets the learning engine rotational speed LNe which is slightly higher than the present engine rotational speed Ne. Then, the learning clutch actuator operation amount calculating section 77 calculates the learning engine torque Teb corresponding to the learning engine rotational speed LNe for the present throttle opening degree (the engine output control operating amount).

Further, the learning clutch actuator operation amount calculating section 77 calculates the learning clutch actuator operation amount Saa that corresponds to the learning clutch torque Tca being equal in magnitude to the learning engine torque Teb, based on the engine torque detecting section 56. Thereafter, the clutch actuator learning operating section 78 operates the clutch actuator 17 by the learning clutch actuator operation amount Saa. As a result, the clutch device 30 is slipped at the engagement portion to allow the engine rotational speed to rise to the actual engine rotational speed RNe. In this state, when the actual engine rotational speed and the engine torque become stable and when the difference between the actual engine rotational speed detected by the engine rotational speed detecting section 54 and the learning engine rotational speed LNe becomes the tolerable valve or less, the value of the clutch torque corresponding to the learning clutch actuator operation amount Saa is replaced by the stable engine torque Tec to be compensated as the clutch torque Tcb in the correspondence relation between the clutch actuator operation amounts and the clutch torques.

Like this, in the low torque range of the engine torque Te, the learning is performed as the clutch device 30 is slipped at the engagement portion so that the engine rotational speed Ne becomes the learning engine rotational speed LNe. Thus, it does not occur that the drivability is influenced due to a gear change shock or the like which is generated in engaging or disengaging the clutch device 30, and hence, it is possible to perform the learning properly with the generation of heat suppressed at the engagement portion of the clutch device 30.

Further, the predetermined low torque value that is detected by the low torque detecting section and that is equal to or less than the predetermined value is the value indicating ⅕ (the value may be in the range of ⅕ to ¼) of the maximum value of the engine torque. In the state of the engine toque being sufficiently low like this, because the learning is performed as the clutch device 30 is slipped at the engagement portion so that engine rotational speed Ne becomes the learning engine rotational speed LNe, the drivability is not influenced, and hence, it is possible to perform the learning further properly with the generation of heat suppressed in the clutch device 30.

Next, a second embodiment will be described with reference to Flowchart 2 in FIG. 8 along with FIGS. 7 and 9. In the second embodiment, there are provided a learning clutch actuator operation amount calculating section 87, a clutch actuator learning operating section 88 and a clutch torque to operation amount compensating section 80 that are modified in part from the learning clutch actuator operation amount calculating section 77, the clutch actuator learning operating section 78 and the clutch torque to operation amount compensating section 60 in the first embodiment, and the following description will be made to refer also to the details of such modifications.

In the second embodiment, modifications are made at other steps than steps S10 to S12 in Flowchart 1 in the first embodiment. Step S13 is altered to step S13a. Step S14 is altered to steps S14a and S14b, and step S15 is altered to steps S15a and S15b. Steps S16 is altered to steps S16a through S16e. Steps S17 and S18 are altered to steps S17a and S18a, and step S19 is deleted. Further, the step S20 is altered to step S20a.

At steps S10 to S12, the same processing as those in Flowchart 1 is executed. Therefore, regarding Flowchart 2, the respects having been altered will be described in detail, and the parts being the same as those in Flowchart 1 will be given the same step symbols and will be described at only the occasions that description becomes necessary.

First of all, like Flowchart 1, Flowchart 2 starts at the starting of the hybrid vehicle 1 (step S10). Then, as executed in Flowchart 1, the processing is executed from step S11 to step S12.

Figure 9:
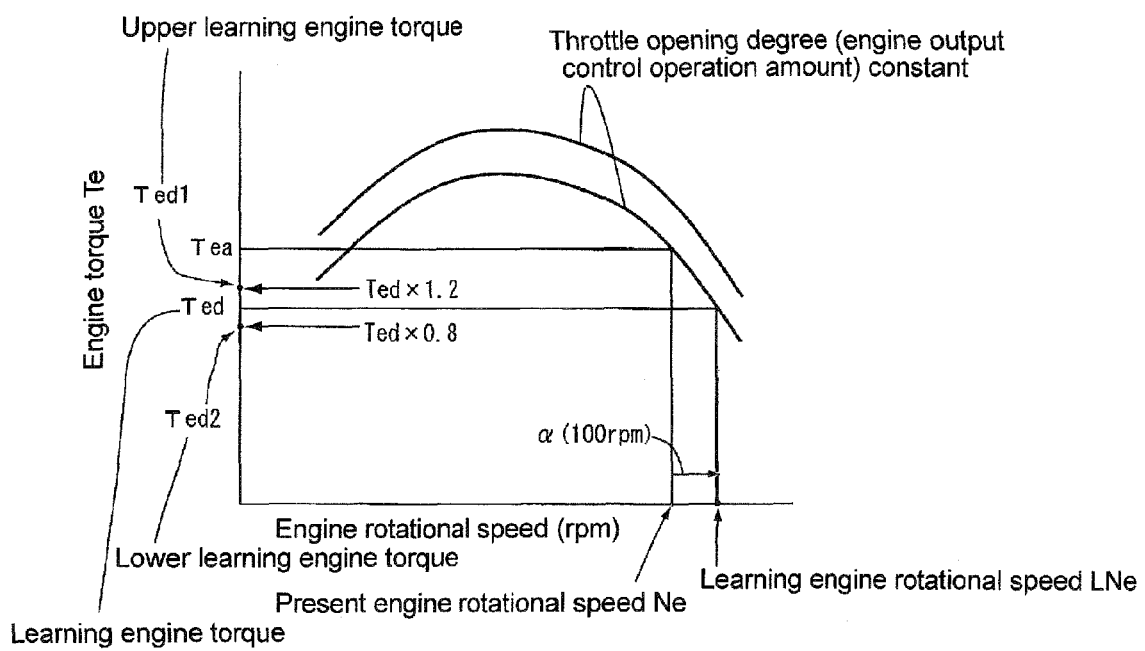
FIG. 9 is a graph of engine torque to engine rotational speed when the engine output control operation amount is fixed, according to the second embodiment.

At step S13a (the learning engine rotational speed setting section 58), the learning engine rotational speed LNe is calculated with the setting of α=100 rpm made in the learning engine rotational speed LNe="the present engine rotational speed Ne+α rpm" (refer to FIG. 9). Here, α=100 rpm is the value which was obtained through repetitive experiments by the inventors. By setting α=100 rpm, it becomes possible to reliably realize the slipping of the clutch device 30 suitable for learning without spoiling the driver's feeling of drivability.

At step S14a (the learning clutch actuator operation amount calculating section 87), the engine torque detecting section 56 calculates a learning engine torque Ted corresponding to the learning engine rotational speed LNe by the use of a map shown in FIG. 9.

At step S14b (the learning clutch actuator operation amount calculating section 87), the learning engine torque Ted calculated at step S14a is multiplied with 1.2 and 0.8 to calculate an upper learning engine torque Ted1 (Ted×1.2) and a lower learning engine torque Ted2 (Ted×0.8). That is, by multiplying 1.2 and 0.8 with the learning engine torque Ted, there are set upper and lower limit values which are ±20% of the learning engine torque Ted.

Figure 7:
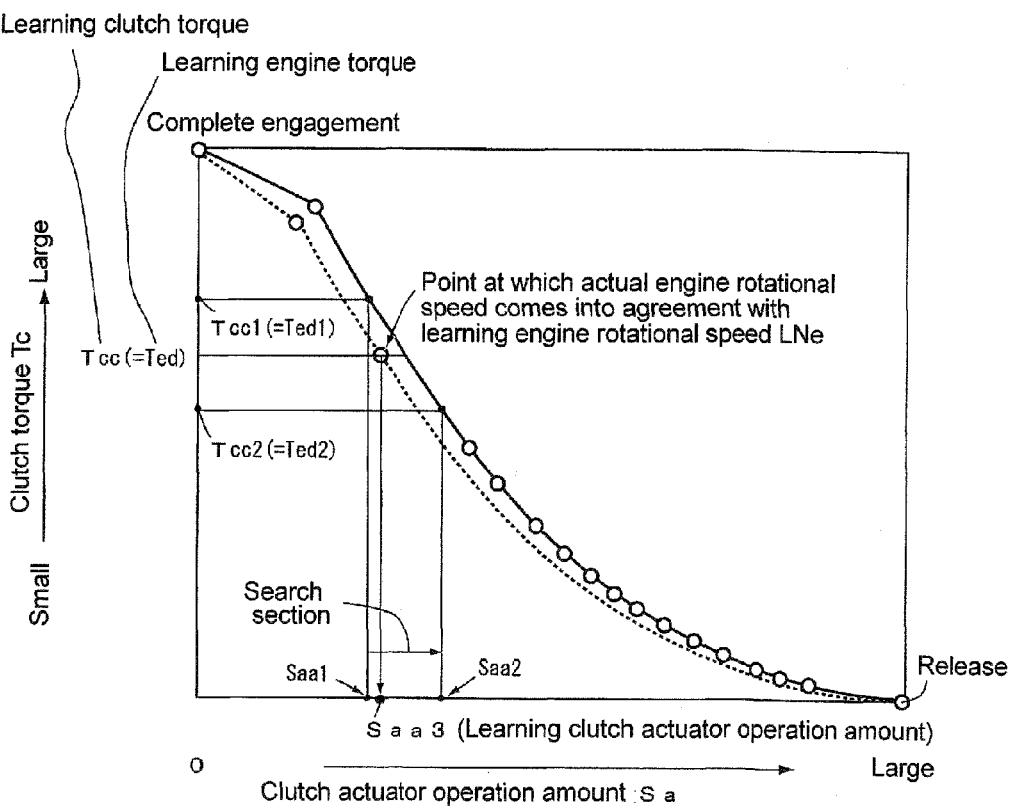
FIG. 7 is a clutch torque map showing the relation between clutch torques and clutch actuator operation amounts according to a second embodiment.
Figure 8:
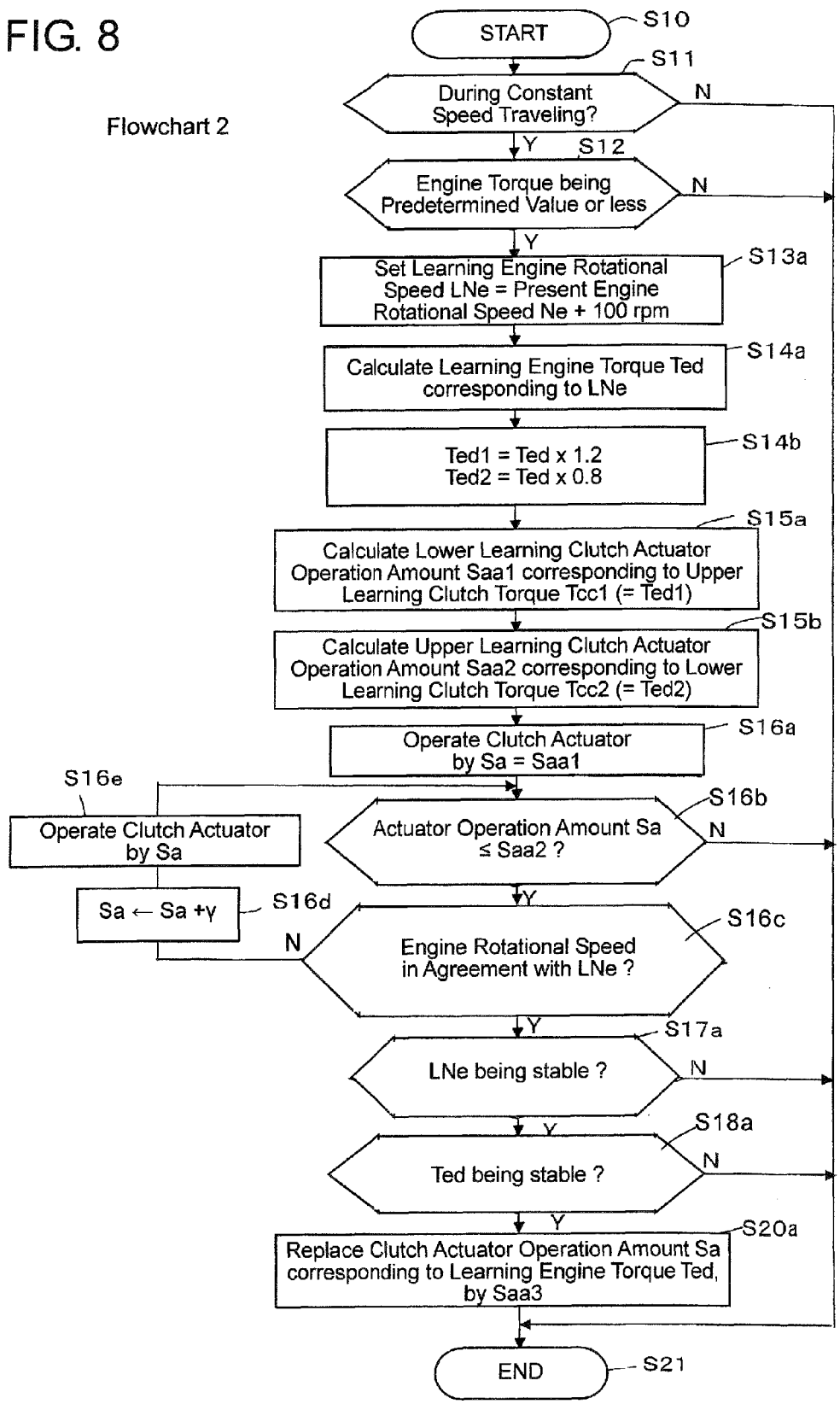
FIG. 8 is Flowchart 2 according to the second embodiment.

At step S15a (the learning clutch actuator operation amount calculating section 87), a lower learning clutch actuator operation amount Saa1 that corresponds to an upper learning clutch torque Tcc1 being equal to the upper learning engine torque Ted1 is calculated by the use of a map in FIG. 7 possessed by the clutch torque to operation amount storage section 51.

At step S15b (the learning clutch actuator operation amount calculating section 87), an upper learning clutch actuator operation amount Saa2 that corresponds to a lower learning clutch torque Tcc2 being equal to the lower learning engine torque Ted2 is calculated by the use of the map in FIG. 7 possessed by the clutch torque to operation amount storage section 51.

At step S16a (the clutch actuator learning operating section 88), the output rod 64 of the clutch actuator 17 is moved by the use of the clutch control section 52 by the lower learning clutch actuator operation amount Saa1 and is then stopped.

At step S16b (the clutch actuator learning operating section 88), it is confirmed whether the clutch actuator operation amount Sa has exceeded the upper learning clutch actuator operation amount Saa2 or not. If the amount Saa2 has not been exceeded, the program is moved to step S16c. If the upper learning clutch actuator operation amount Saa2 has been exceeded, the program is moved to step S21 and is terminated.

At step S16c (the clutch actuator learning operating section 88), it is confirmed whether the actual engine rotational speed and the learning engine rotational speed LNe indicated in FIG. 9 when the operation by the clutch actuator 17 has been made by the predetermined clutch actuator operation amount Sa are in agreement to the degree that they are regarded as the same or not. Then, the program is advanced to step S17a if the agreement is regarded to have been made but to step S16d if the agreement has not been made.

At step S16d (the clutch actuator learning operating section 88), the clutch actuator operation amount Sa=Sa+γ is set. At this time, Sa on the right side is the lower learning clutch actuator operation amount Saa1 in the case of the first time. Further, γ is for the purpose of slipping the clutch device 30 by increasing the operation amount gradually from the lower learning clutch actuator operation amount Saa1 so that the actual engine rotational speed is made to reach the learning engine rotational speed LNe, and may be set arbitrarily. For example, the increment per time may be set to 3 mm or so or may be set to a value which is made by equally dividing to ten the distance between the learning clutch actuator operation amounts Saa and Sab. Alternatively, the value may be a value which is obtained by the division of hundred equal parts. Then, the program is moved to step S16e.

At step S16e (the clutch actuator learning operating section 88), the clutch actuator 17 is operated so that the clutch actuator operation amount Sa calculated at step S16d is attained. Actually, this can be done by performing the operation by the amount that exceeds the lower learning clutch actuator operation amount Saa1. Then, the step S16b is reached, whereby steps 16b through 16e are processed repetitively until the actual engine rotational speed and the learning engine rotational speed LNe come into agreement at step S16c. Then, when the actual engine rotational speed becomes equal to the learning engine rotational speed LNe at step S16c, the program is advanced to step S17a.

At step S17a, the stability of the learning engine rotational speed LNe is confirmed. At step S18a, the stability of the learning engine torque Ted is confirmed. Then, the program is moved to step S20a if the learning engine rotational speed LNe and the learning engine torque Ted are stabilized for respective predetermined periods of time within respective bands, but is terminated if the stabilities are not kept.

At step S20a (the clutch torque to operation amount compensating section 80), a learning clutch torque actuator operation amount Saa3 that makes the actual engine rotational speed equal to the learning engine rotational speed LNe is replaced as the clutch actuator operation amount Sa corresponding to the learning engine torque Ted to compensate the correspondence relation (map) in FIG. 7 between the clutch actuator operation amounts Sa and the clutch torques Tc (refer to broken line in FIG. 7). Then, at the time of the next gear change, the control of the clutch torque Tc by operating the clutch device 30 is executed based on the data so compensated.

As described above, in the second embodiment, the rotational speed α that is increased from the present engine rotational speed Ne to determine the learning engine rotational speed LNe is set to 100 rpm that was obtained through experiments as being optimum to the learning. Then, calculations are done for the learning engine torque Ted corresponding to the learning engine rotational speed LNe as well as for the upper and lower learning engine torques Ted1 and Ted2 at two upper and lower points that put the learning engine torque at the center therebetween. Then, the clutch actuator 17 is operated from the end position of the lower learning clutch actuator operation amount Saa1 corresponding to the upper learning engine torque Ted1 toward the end position of the upper learning clutch actuator operation amount Saa2 corresponding to the lower learning engine torque Ted2, whereby a learning clutch actuator operation amount Saa3 is searched and derived that realizes the learning engine rotational speed LNe set for learning. Thereafter, the correspondence relation between the clutch actuator operation amounts Sa and the clutch torques Tc is compensated based on the learning clutch actuator operation amount Saa3 corresponding to the learning engine torque Ted (=the learning clutch torque Tcc). In this way, since the learning and the compensation are executed in the state of realizing the learning engine rotational speed LNe set for learning, it is possible to perform the compensation precisely.

Further, the hybrid vehicle 1 in the present embodiments is the hybrid vehicle of a so-called parallel type wherein the clutch device 30 is disconnectably coupled to the output shaft (output shaft 31) of the engine 11 and the input shaft 34 of the automatic transmission 13, while the MG 12 is rotationally coupled to the output shaft 35 of the automatic transmission 13 and is also rotationally coupled to the drive wheels 16a, 16b through the drive shafts 15a, 15b. Since the hybrid vehicle 1 constructed like this is able to start by the driving force of the MG 12 only, the opportunities to learn the clutch actuator operation amount Sa at the time of a starting are decreased. In this case, in the present invention, the opportunities to learn the clutch actuator operation amount Sa can be properly increased in the low torque range other than at the time of a starting, and hence, it is possible to execute the speed change control stably.

Further, in the present embodiments, description has been made taking as example the hybrid vehicle of the construction that the engine 11 and the MG 12 are in parallel relation and are able to drive the vehicle respectively independently of each other. However, without being limited to this construction, the application may be implemented to a clutch learning control in a hybrid vehicle of the type that the MG and the engine are coupled in series wherein the driving force outputted by the MG is transmitted to the differential gear (differential) 14, or in a vehicle whose traveling is performed by an engine only. Further, the application is also possible to an A/T vehicle.

Various features and many of the attendant advantages in the foregoing embodiments will be summarized as follows:

According to the transmission control device for the vehicle in the first embodiment shown in FIGS. 1-6, if the engine torque Te is judged by the low torque detecting section 57 to be a low torque which is equal to less than the predetermined value, first the learning engine rotational speed setting section 58 sets the learning engine rotational speed LNe which is slightly (+α) higher than the present engine rotational speed Ne. Then, the clutch torque to operation amount compensating section (60) calculates the learning engine torque Teb corresponding to the learning engine rotational speed LNe for the present engine output control operation amount. Further, the learning clutch actuator operation amount Saa corresponding to the clutch torque being equal in magnitude to the learning engine torque Teb is calculated based on the engine torque detecting section 56, and the clutch actuator 17 is operated by the learning clutch actuator operation amount Saa. As a result, the clutch 30 is slipped to allow the engine rotational speed Ne to rise to the actual engine rotational speed RNe. In this state, when the difference between the actual engine rotational speed RNe detected by the engine rotational speed detecting section 54 and the learning engine rotational speed LNe becomes the tolerable valve or less, the value Tca of the clutch torque that corresponds to the learning clutch actuator operation amount Saa is replaced by the engine torque Tec which is detected upon the operation by the learning clutch actuator operation amount Saa, to be compensated in the correspondence relation between the clutch actuator operation amounts Sa and the clutch torques Tc. Like this, in the low torque range of the engine torque, the learning is performed as the clutch 30 is slipped so that the engine rotational speed Ne becomes the learning engine rotational speed LNe. Thus, it does not occur that the drivability is influenced due to a gear change shock or the like which is generated in engaging or disengaging the clutch 30, and hence, it is possible to perform the learning properly with the generation of heat suppressed in the clutch 30.

According to the transmission control device for the vehicle in the second embodiment shown in FIGS. 1-2 and 7-9, calculations are made for the learning engine torque LNe as well as for the upper and lower learning engine torques Ted1, Ted2 at two upper and lower points putting the learning engine torque LNe at the center therebetween. Then, the clutch actuator 17 is operated from the lower learning clutch actuator operation amount Saa1 corresponding to the upper learning engine torque Ted1 toward the upper learning clutch actuator operation amount Saa2 corresponding to the lower learning engine torque Ted2, whereby the learning clutch actuator operation amount Saa3 is derived that realizes the learning engine rotational speed LNe set for learning. Thereafter, the correspondence relation between the clutch actuator operation amounts Sa and the clutch torques Tc is compensated based on the learning clutch actuator operation amount Saa3 corresponding to the learning engine torque Ted. In this way, since the learning and the compensation are executed in the state of realizing the learning engine rotational speed LNe set for learning, it is possible to perform the compensation precisely.

Figure 4:
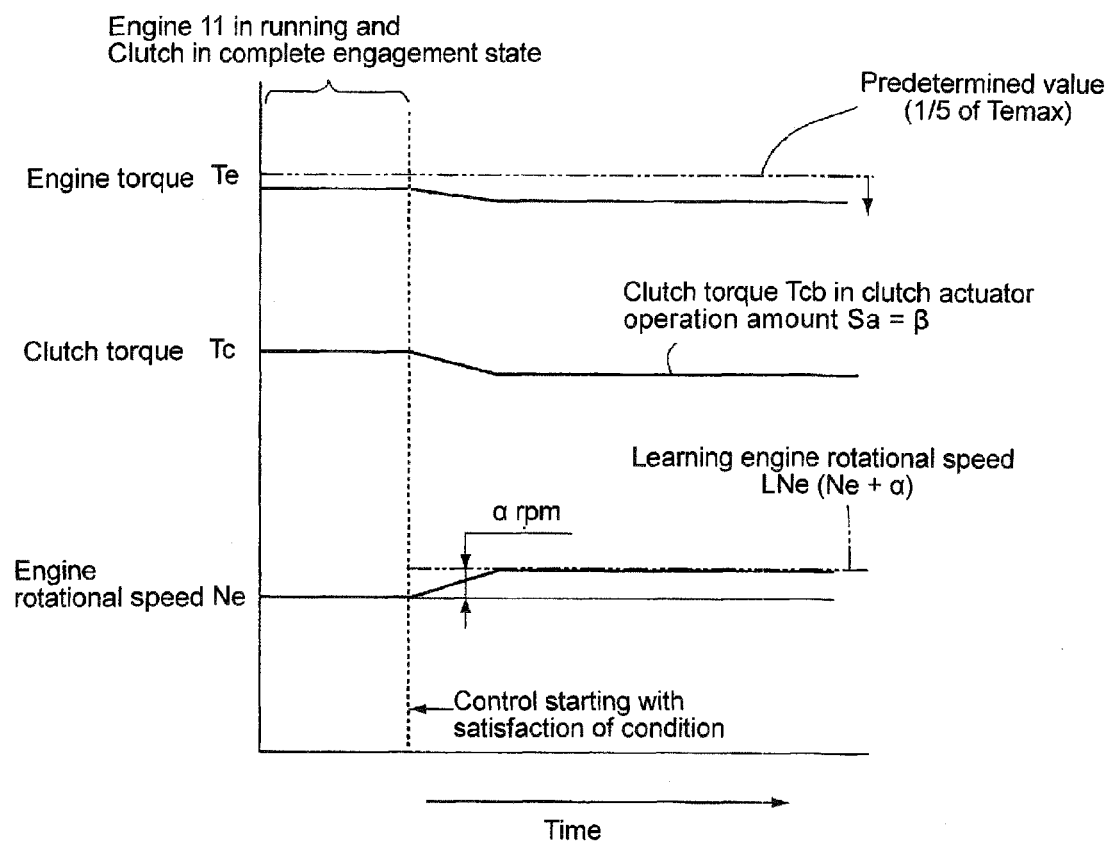
FIG. 4 is a chart showing a control state of the transmission control device according to the present embodiment.

According to the transmission control device for the vehicle in the first and second embodiments typically shown in FIGS. 4, 6 and 9, the predetermined low torque value that is detected by the lower torque detecting section 57 and that is equal to or less than the predetermined value is the value in the range of ⅕ to ¼ of the maximum value of the engine torque Te. In the state of the engine toque Te being sufficiently low like this, the learning is performed as the clutch 30 is slipped so that engine rotational speed Ne becomes the learning engine rotational speed LNe or the engine torque Te becomes the learning engine torque Teb, Ted. Thus, it does not occur that the drivability is influenced due to a gear change shock or the like which is generated in engaging or disengaging the clutch 30, and hence, it is possible to perform the learning further properly with the generation of heat suppressed in the clutch 30.

According to the transmission control device for the vehicle in the second embodiment typically shown in FIGS. 7 and 9, the upper and lower learning engine torques Ted1, Ted2 are values which are respectively increased and decreased 20% relative to the learning engine toque Ted. By setting the range like this, the learning clutch actuator operation amount Saa3 that realizes the learning engine rotational speed LNe being slightly (+α) higher than the present engine rotational speed Ne can be properly included in the range, and the search time is restrained from lengthening.

According to the transmission control device for the vehicle in each of the first and second embodiments typically shown in FIGS. 1-2, 3 and 7, the transmission control device is designed for the hybrid vehicle of a so-called parallel type wherein the clutch 30 disconnectably couples the output shaft 31 of the engine 11 to the input shaft 34 of the automatic transmission 13 and wherein the motor 12 is rotationally coupled to the output shaft 35 of the automatic transmission 13 and is rotationally coupled to the drive wheels 16a, 16b. In the hybrid vehicle 1 constructed like this, the starting can also be done by the driving force of the motor 12 only, and this results in making the opportunities to learn the clutch actuator operation amount Sa at the time of a starting become a small number. In the case like that, it is possible in the present invention to increase the opportunities to learn the clutch actuator operation amount Sa in the low torque range other than at the time of a starting, and hence, it is possible to execute the transmission control stably.

INDUSTRIAL APPLICABILITY

The present invention is applicable to a transmission control device for a hybrid vehicle that is small in the number of opportunities to learn the correspondence relation between clutch actuator operation amounts of a clutch actuator and clutch torques.

The invention claimed is:

1. A transmission control device for a hybrid vehicle, comprising:
an automatic transmission that gear-changes at a plurality of gear ratios the rotation of an input shaft which is adapted to be rotated by an engine torque outputted by an engine mounted on the vehicle, and transmits the rotation to an output shaft rotationally coupled to drive wheels of the vehicle;
a clutch that connects or disconnects an output shaft of the engine with respect to the input shaft of the automatic transmission by the operation of a clutch actuator and controls a clutch torque transmitted from the output shaft to the input shaft to a target clutch torque;

a clutch torque to operation amount storage section that stores a correspondence relation between clutch actuator operation amounts of the clutch actuator for controlling the clutch torque of the clutch and clutch torques;

a clutch control section that obtains a clutch actuator operation amount of the clutch actuator corresponding to a required target clutch torque, from the clutch torque to operation amount storage section and operates the clutch actuator through the clutch actuator operation amount to control the clutch torque to the target clutch torque;

a correspondence relation compensating section that learns and compensates the correspondence relation between the clutch actuator operation amounts and the clutch torques stored in the clutch torque to operation amount storage section;

an engine rotational speed detecting section that detects the rotational speed of the engine;

an engine output control operation amount detecting section that detects an operation amount of an engine output control section that controls the output of the engine;

an engine torque detecting section that detects an engine torque from an engine output control operation amount detected by the engine output control operation amount detecting section and an engine rotational speed detected by the engine rotational speed detecting section, based on a relation between rotational speeds of the engine and engine torques at respective operation amounts of the engine output control section; and a motor rotationally coupled to the input shaft or the output shaft of the automatic transmission;

wherein the correspondence relation compensating section comprises:

a low torque detecting section that detects that the engine torque detected by the engine torque detecting section is a low torque being a predetermined value or less when the output shaft of the engine and the input shaft of the automatic transmission are in a complete engagement state;

a learning engine rotational speed setting section that sets a learning engine rotational speed being slightly higher than the present engine rotational speed;

a learning clutch actuator operation amount calculating section that calculates a learning clutch actuator operation amount corresponding to a learning clutch torques being equal to a learning engine torque which is detected by the engine torque detecting section in correspondence to the learning engine rotational speed, with the engine output control section having the present engine output control operation amount;

a clutch actuator learning operating section that operates the clutch actuator through the learning clutch actuator operation amount; and a clutch torque to operation amount compensating section that, if the difference between an actual engine rotational speed detected by the engine rotational speed detecting section when the clutch actuator is operated through the learning clutch actuator operation amount, and the learning engine rotational speed is equal to or less than a tolerable value, replaces a clutch torque value corresponding to the learning clutch actuator operation amount by an engine torque which is detected by the engine torque detecting section when the clutch actuator is operated through the learning clutch actuator operation amount, in the clutch torque to operation amount storage section.

2. The transmission control device for the hybrid vehicle in claim 1, wherein:

the predetermined value of the low torque detected by the low torque detecting section and being the predetermined value or less is a value in a range of $\frac{1}{5}$ to $\frac{1}{4}$ of a maximum value of the engine torque.

3. The transmission control device for the hybrid vehicle in claim 1, wherein:

the clutch disconnectably couples the output shaft of the engine to the input shaft of the automatic transmission; and the motor is rotationally coupled to the output shaft of the automatic transmission and is rotationally coupled to the drive wheels at a motor reduction ratio.

4. A transmission control device for a hybrid vehicle, comprising:

an automatic transmission that gear-changes at a plurality of gear ratios the rotation of an input shaft which is adapted to be rotated by an engine torque outputted by an engine mounted on the vehicle, and transmits the rotation to an output shaft rotationally coupled to drive wheels of the vehicle;

a clutch that connects or disconnects an output shaft of the engine with respect to the input shaft of the automatic transmission by the operation of a clutch actuator and controls a clutch torque transmitted from the output shaft to the input shaft to a target clutch torque;

a clutch torque to operation amount storage section that stores a correspondence relation between clutch actuator operation amounts of the clutch actuator for controlling the clutch torque of the clutch and clutch torques;

a clutch control section that obtains a clutch actuator operation amount of the clutch actuator corresponding to a required target clutch torque, from the clutch torque to operation amount storage section and operates the clutch actuator through the clutch actuator operation amount to control the clutch torque to the target clutch torque;

a correspondence relation compensating section that learns and compensates the correspondence relation between the clutch actuator operation amounts and the clutch torques stored in the clutch torque to operation amount storage section;

an engine rotational speed detecting section that detects the rotational speed of the engine;

an engine output control operation amount detecting section that detects an operation amount of an engine output control section that controls the output of the engine;

an engine torque detecting section that detects an engine torque from an engine output control operation amount detected by the engine output control operation amount detecting section and an engine rotational speed detected by the engine rotational speed detecting section, based on a relation between rotational speeds of the engine and engine torques at respective operation amounts of the engine output control section; and a motor rotationally coupled to the input shaft or the output shaft of the automatic transmission;

wherein the correspondence relation compensating section comprises:

a low torque detecting section that detects that the engine torque detected by the engine torque detecting section is a low torque being a predetermined value or less when the output shaft of the engine and the input shaft of the automatic transmission are in a complete engagement state;

a learning engine rotational speed setting section that sets a learning engine rotational speed being slightly higher than the present engine rotational speed;

a learning clutch actuator operation amount calculating section that calculates a learning engine torque which is detected by the engine torque detecting section in correspondence to the learning engine rotational speed, with the engine output control section having the present engine output control operation amount, and upper and lower learning engine torques putting the learning engine torque at a center therebetween and that calculates lower and upper learning clutch actuator operation amounts which correspond to upper and lower learning clutch torques being equal to the upper and lower learning engine torques;

a clutch actuator learning operating section that operates the clutch actuator from the lower learning clutch actuator operation amount toward the upper learning clutch actuator operation amount until the engine rotational speed becomes the learning engine rotational speed; and a clutch torque to operation amount compensating section that replaces the clutch actuator operation amount when the engine rotational speed becomes equal to the learning engine rotational speed, as a learning clutch actuator operation amount which corresponds to a learning clutch torque being equal to the learning engine torque, in the clutch torque to operation amount storage section.

5. The transmission control device for the hybrid vehicle in claim 4, wherein:

the predetermined value of the low torque detected by the low torque detecting section and being the predetermined value or less is a value in a range of $\frac{1}{5}$ to 14 of a maximum value of the engine torque.

6. The transmission control device for the hybrid vehicle in claim 4, wherein:

the upper and lower learning engine torques are values which are respectively increased and decreased 20% relative to the learning engine torque.

7. The transmission control device for the hybrid vehicle in claim 4, wherein:

the clutch disconnectably couples the output shaft of the engine to the input shaft of the automatic transmission; and the motor is rotationally coupled to the output shaft of the automatic transmission and is rotationally coupled to the drive wheels at a motor reduction ratio.

* * * * *